US009527332B2

(12) United States Patent
Sarrazin

(10) Patent No.: US 9,527,332 B2
(45) Date of Patent: Dec. 27, 2016

(54) CREASE-RESISTANT SECURITY FILM

(71) Applicant: ARJOWIGGINS SECURITY, Boulogne Billancourt (FR)

(72) Inventor: Pierre Sarrazin, Saint George en Valdaine (FR)

(73) Assignee: ARJOWIGGINS SECURITY, Boulogne Billancourt (FR)

( * ) Notice: Subject to any disclaimer, the term of this patent is extended or adjusted under 35 U.S.C. 154(b) by 0 days.

(21) Appl. No.: 14/646,577

(22) PCT Filed: Nov. 28, 2013

(86) PCT No.: PCT/IB2013/060472
§ 371 (c)(1),
(2) Date: May 21, 2015

(87) PCT Pub. No.: WO2014/083527
PCT Pub. Date: Jun. 5, 2014

(65) Prior Publication Data
US 2015/0298481 A1 Oct. 22, 2015

(30) Foreign Application Priority Data
Nov. 29, 2012 (FR) ...................... 12 61430

(51) Int. Cl.
| | |
|---|---|
| *G06K 19/06* | (2006.01) |
| *B42D 25/23* | (2014.01) |
| *D21H 17/44* | (2006.01) |
| *D21H 17/45* | (2006.01) |
| *D21H 17/56* | (2006.01) |
| *D21H 17/57* | (2006.01) |
| *D21H 21/06* | (2006.01) |
| *D21H 21/40* | (2006.01) |
| *D21H 17/25* | (2006.01) |
| *D21H 17/55* | (2006.01) |
| *D21H 21/48* | (2006.01) |
| *G06K 19/077* | (2006.01) |

(52) U.S. Cl.
CPC ............. *B42D 25/23* (2014.10); *D21H 17/25* (2013.01); *D21H 17/44* (2013.01); *D21H 17/45* (2013.01); *D21H 17/55* (2013.01); *D21H 17/56* (2013.01); *D21H 17/57* (2013.01); *D21H 21/06* (2013.01); *D21H 21/40* (2013.01); *D21H 21/48* (2013.01); *G06K 19/07745* (2013.01)

(58) Field of Classification Search
CPC D21H 21/42; B42D 25/355; G06K 19/07722; G06K 19/07749; G06K 19/07728; H01L 21/50
See application file for complete search history.

(56) References Cited

U.S. PATENT DOCUMENTS

| | | | |
|---|---|---|---|
| 2,721,140 A | 10/1955 | Weisgerber | |
| 2,931,749 A | 4/1960 | Kine et al. | |
| 3,483,025 A | 12/1969 | Isaacs | |
| 3,776,812 A | 12/1973 | Jongetjes et al. | |
| 3,792,128 A | 2/1974 | Uffner et al. | |
| 4,112,192 A | 9/1978 | Vreeland | |
| 4,121,966 A | 10/1978 | Amano et al. | |
| 4,189,345 A | 2/1980 | Foster et al. | |
| 4,247,318 A | 1/1981 | Lee et al. | |
| 4,400,440 A | 8/1983 | Shaw | |
| 4,460,348 A | 7/1984 | Iioka et al. | |
| 5,342,875 A | 8/1994 | Noda | |
| 5,405,500 A | 4/1995 | Knight | |
| 5,447,335 A | 9/1995 | Haslop | |
| 5,565,062 A | 10/1996 | Nass et al. | |
| 5,660,919 A | 8/1997 | Vallee et al. | |
| 5,977,211 A | 11/1999 | Koyama | |
| 8,851,385 B2 * | 10/2014 | Vogt ................ | G06K 19/07722 235/492 |
| 2003/0105190 A1 | 6/2003 | Diehl et al. | |
| 2003/0234089 A1 | 12/2003 | Ryan et al. | |
| 2004/0023008 A1 | 2/2004 | Rosset | |
| 2006/0037727 A1 | 2/2006 | Hagiopol et al. | |
| 2006/0141882 A1 | 6/2006 | Quincy et al. | |
| 2006/0249268 A1 | 11/2006 | Ryan et al. | |
| 2007/0065187 A1 * | 3/2007 | Kodera ................ | G03G 15/167 399/307 |
| 2007/0090196 A1 | 4/2007 | Vast et al. | |
| 2008/0020200 A1 | 1/2008 | Stokes et al. | |
| 2010/0078930 A1 * | 4/2010 | Rosset ................ | D21H 17/42 283/57 |
| 2011/0089677 A1 * | 4/2011 | Rosset ................ | D21H 21/42 283/85 |

FOREIGN PATENT DOCUMENTS

| | | |
|---|---|---|
| CZ | 186814 B1 | 2/1981 |
| DE | 102005052672 A1 | 5/2007 |

(Continued)

OTHER PUBLICATIONS

U.S. Appl. No. 12/599,219, filed Nov. 25, 2009 in the name of Henri Rosset.

(Continued)

*Primary Examiner* — Thien T Mai
(74) *Attorney, Agent, or Firm* — Oliff PLC

(57) ABSTRACT

The invention relates to a crease-resistant security film including: fibers; polyurethane aggregates, the proportion of said polyurethane amounting to between 5 and 45 wt. % in relation to the total dry weight of the fibers and the polyurethane, and said polyurethane having a break elongation that is higher than 600%; and a main cationic flocculant in a quantity of between 1 and 5 wt. % in relation to the total dry weight of the fibers and the polyurethane. The invention also relates to the method for the production of said film, and to a security document including said security film.

25 Claims, No Drawings

(56) References Cited

FOREIGN PATENT DOCUMENTS

| EP | 0 024 602 B1 | 10/1983 |
| --- | --- | --- |
| EP | 0 717 146 A2 | 6/1996 |
| EP | 0 695 830 B1 | 7/2002 |
| EP | 1 241 225 A2 | 9/2002 |
| EP | 1 338 430 A1 | 8/2003 |
| EP | 1 469 125 A1 | 10/2004 |
| GB | 824286 A | 11/1959 |
| WO | 91/12372 A1 | 8/1991 |
| WO | 99/33901 A1 | 7/1999 |
| WO | 00/039391 A1 | 7/2000 |
| WO | 02/20902 A1 | 3/2002 |
| WO | 02/46529 A1 | 6/2002 |
| WO | 03/052197 A2 | 6/2003 |
| WO | 2006/048280 A1 | 5/2006 |
| WO | 2008/152299 A2 | 12/2008 |
| WO | 2009/150117 A1 | 12/2009 |

OTHER PUBLICATIONS

Mar. 16, 2012 Office Action Issued in Russian Application No. 2009143616.
Jan. 22, 2009 International Search Report issued in Application No. PCT/FR2008/050924.
Mar. 17, 2014 International Search Report issued in Application No. PCT/IB2013/060472.
Apr. 30, 2012 Office Action issued in U.S. Appl. No. 12/599,219.
Jan. 22, 2013 Office Action issued in U.S. Appl. No. 12/599,219.
Jul. 18, 2013 Office Action issued in U.S. Appl. No. 12/599,219.
Apr. 29, 2014 Office Action issued in U.S. Appl. No. 12/599,219.
Jun. 17, 2015 Office Action issued in U.S. Appl. No. 12/599,219.
Jun. 17, 2015 Notice of Opponent issued in European Patent No. 2 148 954.
Jul. 23, 2014 Notice of Opposition issued in European Patent No. 2 148 954.
Hercules Incorporated, Product Data KYMENE 557 H, published Aug. 25, 1987, 3 pages.
Battista, "Synthetic Fibers in Papermaking," Polymer Engineering and Technology, pp. 56-96, Feb. 1964.
Chan, "Wet-Strength Resins and Their Application," Tappi Press, 1994.
Nakamura et al., "Heat Capacities of Carboxymethylcellulose-Nonfreezing Water Systems at Around Glass Transition Temperature," Kobunshi Ronbunshu, vol. 53, No. 12, pp. 860-865, Dec. 1996.
Das Papierbuch, Handbuch der Papierherstellung, ECA Pulp & Paper b.v, 2nd Edition 2006.
Feb. 1, 2016 Office Action Issued in U.S. Appl. No. 12/599,219.

\* cited by examiner

CREASE-RESISTANT SECURITY FILM

The invention relates to a crease-resistant security sheet, the process for the manufacture thereof and a security document comprising this sheet.

Currently, many security documents, such as banknotes or identity documents, comprise paper supports.

One drawback of the paper supports used is that they have poor crease resistance. Thus, the creased zones have deep, irreversible folds that have poor resistance to soiling, so that these creased zones are weakened and often lead to tears.

This is particularly disadvantageous in the case of documents which, during the handling thereof, are frequently folded or creased, such as for example banknotes, the presence of folds weakening them and reducing their service life, and making the automated treatment thereof difficult, for example during checks of authenticity or wear on a sorting machine.

Known from document US 2004/0023008 are security sheets, in particular banknotes, which are resistant to the effects of circulation, using polyurethanes and a poly(amino-amide-epichlorohydrin) resin as a wet strength agent. However, this document does not mention a cationic flocculating agent. On the contrary, the polyurethane is crosslinked. Furthermore, the process proposed in this document concerns surface treatment.

As will emerge hereinbelow from the description, neither the surface treatment nor the crosslinking are suitable for meeting the objectives set by the invention, namely conferring crease resistance.

The bulk treatment of the paper is one of the solutions which may be envisaged for improving the crease resistance.

As will be explained in detail hereinbelow, the use of flocculation, before the formation of the sheet, makes it possible to form a cellulose-flocculating agent-polymer overall network via the formation of bonds made possible owing to the presence of the flocculating agent.

Thus, document WO 2008/152299 describes security sheets comprising an anionic polymer having a glass transition temperature above −40° C. and a cationic flocculating agent, which have a good crease resistance.

However, the improvement in the tensile strength, in particular in the dry and wet breaking lengths and in the double-fold endurance of the security sheets is constantly desired.

Indeed, it has been able to be observed that the flocculation of anionic polymer dispersions as proposed in WO 2008/152299 leads to a reduction of certain mechanical properties such as the tensile strength, in particular the dry and wet breaking lengths, with respect to a standard paper.

There is therefore a need to provide a security sheet that has an improvement in its mechanical properties such as the tensile strength, in particular the dry and wet breaking lengths, and the double-fold endurance while retaining a good crease resistance.

Unexpectedly, the inventors have observed that such an objective could be achieved subject to combining an anionic dispersion of a polyurethane, the polyurethane having an elongation at break of greater than 600%, and a cationic flocculating agent during the manufacture of a security sheet.

The term "anionic dispersion" is understood to mean an aqueous suspension of particles having an anionic surface charge. Said surface charge is preferably provided by a surfactant compound used during the formation of said particles. The term "dispersion" is used here generically and may therefore also denote an emulsion.

Thus, the present invention relates to a crease-resistant security sheet comprising fibers, polyurethane aggregates, said polyurethane being in a proportion of between 5% and 45% by dry weight relative to the total dry weight of the fibers and of the polyurethane and having an elongation at break of greater than 600%, in particular according to the DIN 53504 standard, and a main cationic flocculating agent in an amount of between 1% and 5% by dry weight relative to the total dry weight of the fibers and of the polyurethane.

The expression "polyurethane aggregates" denotes the flocculated anionic polyurethane dispersion which has undergone the standard steps of the papermaking process, namely drainage, pressing and drying. Under the effect of said standard steps of the papermaking process, the polyurethane dispersion undergoes a coalescence resulting in the formation of said polyurethane aggregates within the cellulose-flocculating agent network.

According to one embodiment of the invention, said sheet additionally comprises a secondary cationic flocculating agent in an amount of between 0.1% and 0.5% by dry weight relative to the total dry weight of the fibers and of the polyurethane.

This embodiment is particularly advantageous when the proportion of the polyurethane by dry weight relative to the total weight of the dry fibers is high, in particular when it exceeds 20% by dry weight relative to the total weight of the fibers, since the presence of the secondary cationic flocculating agent makes it possible to perfect the flocculation of the polyurethane.

The Applicant has found, as is stated in the examples hereinbelow, that the presence of polyurethane aggregates and flocculating agent(s) in the composition of the sheet according to the invention made it possible to significantly improve the tensile strength, in particular the dry and wet breaking lengths, and also the wet strength, along with the double-fold endurance and the internal bond strength, while retaining a good crease resistance and tear resistance of said sheet.

During the experiments that it carried out, the Applicant found that only the sheets comprising polyurethanes with an elongation at break of greater than 600% exhibited excellent crease resistance, dry and wet tensile strength and double-fold endurance characteristics.

Thus, the sheet according to the invention may have a porosity after creasing similar to that of an uncreased sheet, that is to say that the folds caused by the creasing cause practically no weakening of the paper. This characteristic enables the security sheet according to the invention to have a very long circulation life.

With a view to highlighting the advantage of flocculation, as carried out within the context of the present invention, a description of this phenomenon is presented below, without this tying the inventors to this theory.

The flocculation phenomenon is expressed chemically by the formation, in an aqueous medium, of electrostatic bonds between a chemical compound having ionized groups, namely within the context of the invention the anionic polyurethane dispersion, and a flocculating agent having ionized groups of opposite charge to that of the chemical compound. The flocculating agent forms weak atomic bonds (of the order of 5 kJ/mol) with the chemical compound according to a process of chemical interactions that takes place under mild conditions (for example at ambient temperature) and necessarily in a solvated medium (for example water).

Within the context of the present invention, namely using an anionic particulate chemical compound (or dispersion) and a cationic flocculating agent, the flocculation takes place in two steps:

adsorption of a portion of the anionic particles on the cationic charges of the flocculating agent; then aggregation of the particles via coalescence due to the reduction of the anionic surface charges of the particles and the appearance of van der Waals bonds during standard steps of the papermaking process, namely drainage, pressing and drying.

Thus, the flocculation leads to an inhomogeneous distribution of chemical compound aggregates entangled in a flocculating agent network. The flocculation system is used for a bulk (volume) treatment of the sheet and therefore is carried out at the wet end (period during which the fibers are dispersed in water, then forming a fibrous suspension), before the formation of the sheet.

Thus, the particle aggregates are distributed in the interstices left vacant between the fibers during the formation of the sheet. Since these interstices are no longer accessible after drainage, pressing and drying of the sheet, the penetration of soiling is reduced and the sheet therefore has a better resistance to soiling.

Before the formation of the sheet according to the invention, there is, in addition to bonds between the anionic particles of the polymer and the cationic charges of the flocculating agent, formation of bonds between the anionic charges of the cellulose and the cationic charges of the flocculating agent. Thus a (cellulose-flocculating agent-polymer) overall network is formed, which is retained during the formation of the sheet, which explains the excellent crease resistance, tensile strength, tearing resistance and double-fold endurance results.

To clearly distinguish this flocculation phenomenon from crosslinking, which takes place especially during a coating process, the Applicant has judged it useful to describe below the crosslinking phenomenon.

Unlike the flocculation phenomenon, the crosslinking phenomenon is expressed chemically by the formation of covalent bonds between two entities: a chemical compound and a crosslinker.

The crosslinker, composed of reactive groups, forms strong atomic bonds (of the order of 500 kJ/mol) with certain groups of the chemical compound according to a chemical reaction process that takes place under specific (temperature, pressure, radiation, etc.) energetic conditions. The bonds formed are homogeneously distributed. They are permanent and strong which gives the compound/crosslinker mixture rigidity and a homogeneous dimensional stability, properties which are the opposite of those desired for a security sheet targeted by the invention, which must be flexible and strong.

According to another of its aspects, the present invention relates to a manufacturing process consisting in forming said sheet via a wet route from an aqueous suspension comprising:

fibers, an anionic dispersion of a polyurethane, said polyurethane especially being in a proportion of between 5% and 45% by dry weight relative to the total dry weight of the fibers and of the polyurethane and having an elongation at break of greater than 600%, and a main cationic flocculating agent, especially in an amount of between 1% and 5% by dry weight relative to the total dry weight of the fibers and of the polyurethane, then draining and drying said sheet.

According to yet another of its aspects, the present invention relates to a crease-resistant security sheet comprising fibers, obtained by bulk treatment of said fibers with a flocculation system, said flocculation system comprising an anionic dispersion of polyurethane, said polyurethane having an elongation at break of greater than 600%, and a cationic flocculating agent.

According to yet another of its aspects, the invention relates to a crease-resistant security sheet comprising fibers, said fibers comprising, in bulk, particle aggregates formed following the flocculation of an anionic dispersion of polyurethane, said polyurethane having an elongation at break of greater than 600%, and of a cationic flocculating agent.

Fibers

As specified above, the security sheet according to the invention comprises fibers.

In the present application, the expression "total weight of the fibers" should be understood as meaning "total weight of the dry fibers", unless otherwise indicated.

According to one embodiment of the invention, the fibers that are incorporated into the composition of the sheet comprise natural fibers.

Among the natural fibers, mention may be made of cellulosic fibers, such as wood fibers, for example eucalyptus or softwood fibers or a mixture thereof, and cotton, bamboo, viscose, straw, abaca, esparto, hemp, jute, flax and sisal fibers or mixtures thereof.

The fibers may be bleached, semi-bleached or unbleached.

Preferably, the fibers that are incorporated into the composition of the sheet comprise cellulosic fibers, in particular cotton fibers.

In particular, said cellulosic fibers are present in a proportion of greater than 60% by dry weight relative to the total dry weight of the fibers and of the polyurethane, in particular in a proportion of greater than 70%.

According to one particular embodiment of the invention, said cellulosic fibers represent at least 70% by dry weight of the total amount of fibers.

In particular, said cellulosic fibers are cotton fibers and represent at least 70% by dry weight of the total amount of fibers.

Preferably, according to another embodiment of the invention, the fibers that are incorporated into the composition of the sheet may comprise synthetic fibers.

This embodiment is particularly advantageous since it makes it possible to further improve the tearing resistance properties of the sheet according to the invention.

Indeed, during its research, the Applicant found that, surprisingly, the use of synthetic fibers, generally used in order to strengthen the paper, had a synergistic effect with the use according to the invention of polyurethane. Indeed, the Applicant measured that the sheets containing synthetic fibers, while retaining a high crease resistance, furthermore had a particularly high tearing resistance. The tearing resistance of the sheets according to this particular embodiment of the invention is greater than the tearing resistance of the sheets according to the invention devoid of synthetic fibers and also than the tearing resistance of sheets comprising synthetic fibers but no polymer aggregates.

According to one preferred embodiment of the invention, the synthetic fibers are in a proportion of between 5% and 30% by dry weight relative to the total dry weight of the fibers and of the polyurethane, and better still of between 10% and 15%.

According to one particular embodiment of the invention, the sheet comprises cotton fibers in a proportion of at least 70% by dry weight relative to the total weight of the fibers and synthetic fibers in a proportion of between 10% and 30% by dry weight relative to the total weight of the fibers, the total sum of the cotton fibers and of the synthetic fibers being equal to 100.

In particular, the security sheets according to the invention comprising synthetic fibers have a tearing resistance according to the ISO 1974 standard "Determination of tearing resistance—Elmendorf method" of greater than 1300 mN.

According to one preferred embodiment of the invention, said synthetic fibers are chosen from polyester, polyamide, rayon and viscose fibers, preferably they are polyamide fibers and/or polyester fibers. They may be, for example, polyamide 6-6 fibers or polyester fibers sold by Kuraray under the trade name EP133®.

Anionic Dispersion of Polyurethane

A security sheet according to the invention additionally comprises at least polyurethane aggregates, the polyurethane having an elongation at break of greater than 600%.

The elongation at break is measured according to the DIN 53504 standard "Testing of rubber—determination of tensile strength at break, tensile stress at yield, elongation at break and stress values in a tensile test".

According to the invention, said polyurethane is present in a proportion of between 5% and 45% by dry weight relative to the total dry weight of the fibers and of the polyurethane.

According to one particular embodiment of the invention, the polyurethane present in the security sheet is present in a proportion of between 10% and 30% by dry weight relative to the total dry weight of the fibers and of the polyurethane.

According to one preferred embodiment of the invention, the polyurethane according to the invention, present in the composition of the sheet, has an elongation at break of greater than 1000%, preferably of between 1000% and 3000%.

According to one particular embodiment of the invention, said anionic polyurethane present in the composition of the sheet has a glass transition temperature below 0° C., preferably below −25° C., and more preferably below −40° C.

According to one even more preferred embodiment, said anionic polyurethane present in the composition of the sheet has a glass transition temperature of between −40° C. and −80° C.

The expression "glass transition temperature" is understood to mean the temperature below which the polymer is rigid. When the temperature increases, the polymer passes through a transition state that enables the free macromolecular chains of the amorphous regions to slide with respect to one another and the polymer softens.

In particular, said anionic polyurethane is chosen from a polyurethane-polyester, a polyurethane-polyether and a polyurethane-polycarbonate.

Preferably, said anionic polyurethane is a polyurethane-polyester.

Such polymers are available, for example:
from Bayer, under the name Impranil DLC® (Elongation at break=600%; Tg=−34° C.);
from Alberdingk Boley, under the name Alberdingk U 2101® (Elongation at break=800%; Tg=−50° C.);
from Tanatex Chemicals, under the name Edolan SN® (Elongation at break=1100%; Tg=−45° C.); and
from Baxenden-Kemira, under the name Witcobond 435-82® (Elongation at break=1500%; Tg=−58° C.).

According to one particular embodiment, said anionic polyurethane is not crosslinkable.

Flocculating Agent

A security sheet according to the invention additionally comprises at least one main cationic flocculating agent in an amount of between 1% and 5% by dry weight relative to the total dry weight of the fibers and of the polyurethane.

Preferably, the main cationic flocculating agent is present in an amount of between 1.5% and 2.5% by dry weight relative to the total dry weight of the fibers and of the polyurethane.

The main cationic flocculating agent present in the security sheet according to the invention is chosen from a cationic resin, polyacrylamides, polyethyleneimines, polyvinylamines and mixtures thereof.

According to one preferred embodiment of the invention, the main cationic flocculating agent is a cationic resin. In particular, this resin is a polyamide-amine-epichlorohydrin resin, referred to as a PAAE resin.

According to another embodiment of the invention, the main cationic flocculating agent is chosen from polyacrylamides, polyethyleneimines, polyvinylamines and mixtures thereof.

According to one particular embodiment of the invention, the security sheet comprises, besides the main cationic flocculating agent described above, a secondary cationic flocculating agent.

Such a secondary cationic flocculating agent is present in an amount of between 0.1% and 0.5% by dry weight relative to the total dry weight of the fibers and of the polyurethane.

Preferably, said secondary cationic flocculating agent is chosen from polyacrylamides, polyethyleneimines, polyvinylamines and mixtures thereof.

Security Element

According to one embodiment of the invention, the security sheet comprises at least one security element.

In particular, said security element is chosen from optically variable devices (OVDs), especially elements having an interference effect, in particular iridescent elements, holograms, security threads, watermarks, planchettes, luminescent and/or magnetic and/or metallic pigments or fibers and combinations thereof.

Furthermore, the sheet according to the invention may comprise an RFID device (radio-frequency identification device).

According to another embodiment of the invention, the security sheet comprises at least one zone at least partially devoid of fibers, which zone is also referred to as a "window".

According to another embodiment, the security sheet according to the invention comprises a security thread or strip incorporated, in particular completely or partially, in said sheet, and preferably appearing in at least one window.

Mineral Fillers

According to one embodiment of the invention, the security sheet comprises mineral fillers in an amount of from 1% to 10% by dry weight relative to the total dry weight of the composition of the sheet.

In particular, said mineral fillers are present in a proportion of between 1% and 5% by dry weight with respect to the total dry weight of the composition of the sheet.

These fillers are chosen, for example, from calcium carbonate, kaolin, titanium dioxide or mixtures thereof.

Other Fillers and Adjuvants

The security sheet according to the invention may additionally comprise fillers and adjuvants commonly used in the papermaking field.

These are in particular synthetic fillers, retention agents and/or wet strength agents.

External Surfacing Layer

According to another embodiment of the invention, the security sheet may additionally comprise an external surfacing layer.

These surfacing layers, coated on at least one face of a sheet, are well known to a person skilled in the art and make it possible, for example for a layer based on a polyvinyl alcohol, to improve the double-fold endurance and tensile strength properties of the sheet.

According to another example, the security sheet according to the invention may comprise a surfacing layer intended to strengthen its durability properties, such as for example a layer whose composition is described in application EP 1 319 104 and which comprises a transparent or translucent elastomer binder, such as a polyurethane, and a colloidal silica.

Manufacturing Process

The invention also relates to a process for manufacturing the security sheet described above.

According to the invention, the manufacturing process consists in forming said sheet via a wet route from an aqueous suspension comprising:
 fibers,
 an anionic dispersion of a polyurethane, said polyurethane especially being in a proportion of between 5% and 45% by dry weight relative to the total dry weight of the fibers and of the polyurethane and having an elongation at break of greater than 600%, and
  a main cationic flocculating agent, especially in an amount of between 1% and 5% by dry weight relative to the total dry weight of the fibers and of the polyurethane, then draining and drying said sheet.

According to one embodiment of the invention, said aqueous suspension additionally comprises a secondary cationic flocculating agent in an amount of between 0.1% and 0.5% by dry weight relative to the total dry weight of the fibers and of the polyurethane.

The process of the invention makes it possible, owing to the use of a polyurethane and flocculating agent(s), to flocculate said polyurethane on the fibers and to obtain a security sheet having particularly high crease resistance properties.

According to the invention, the aqueous dispersion of the anionic polyurethane and the main cationic flocculating agent are mixed in bulk in the fibrous suspension before drainage.

This process is clearly different from a coating process.

Thus, according to one particular embodiment of the invention, said aqueous suspension is obtained from a mixture of fibers and said main cationic flocculating agent, to which said anionic dispersion of polyurethane and optionally said secondary cationic flocculating agent are added before carrying out the formation of said sheet.

This embodiment has the advantage of bringing the polyurethane and the flocculating agent into contact in order to facilitate the flocculation.

This embodiment also has the advantage of being able to be applied to aqueous suspensions of "standard" fibers used for the manufacture of security sheets since they comprise wet strength agents that may also be used as main flocculating agents within the context of the present invention.

According to one particular case of the process, said anionic dispersion of polyurethane is added before said secondary flocculating agent.

According to one embodiment of the invention, the process for manufacturing the security sheet comprises a step in which at least one face of said sheet, after drainage of said suspension, is coated with a surfacing layer.

This surfacing layer may make it possible, for example, to improve the folding endurance and/or tensile strength properties or else the durability properties of said sheet, as described above.

The invention also relates to a security document comprising the security sheet that is the subject of the invention, or as obtained by the process that is the subject of the invention, described above.

In particular, the invention relates to a means of payment, such as a banknote, a payment card, a check or a restaurant voucher, an identity document, such as an identity card, a visa, a passport or a driving license, a card, in particular an access card, a lottery ticket, a transport pass or else an entrance ticket to cultural or sporting events, a loyalty card, a benefit card, a season ticket, a playing or trading card, a gift token or a voucher.

It is preferably a banknote, a driving license or a card, in particular an access card, payment card or identity card, loyalty card, benefit card, season ticket, playing card or trading card.

Characterization of the Security Sheet

1. Dry Tensile Strength

In order to evaluate the dry tensile strength, in particular the dry breaking length, it is possible to measure the length at which the sheets break under the effect of their own weight according to the ISO 1924-2 standard.

According to this method, the sheets according to the invention advantageously have a dry breaking length of from 5% to 35%, preferably from 25% to 35%, greater than the dry breaking length of a sheet of the same composition, the polyurethane being replaced by styrene-butadiene as described in the aforementioned document WO 2008/152299.

2. Wet Tensile Strength

In order to evaluate the wet tensile strength, in particular the wet breaking length, it is possible to measure the length at which the sheets break under the effect of their own weight according to the NF Q03-056 standard.

According to this method, the sheets according to the invention advantageously have a wet breaking length of from 3% to 50%, preferably from 30% to 50%, greater than the wet breaking length of a sheet of the same composition, the polyurethane being replaced by styrene-butadiene as described in the aforementioned document WO 2008/152299.

3. Tearing Resistance

The measurements of tearing resistance may be carried out according to the ISO 1974 standard. The tearing index is obtained by dividing the tearing resistance by the grammage measured according to the ISO 536 standard.

4. Double-Fold Endurance

The measurements of double-fold endurance may be carried out according to the ISO 5626 standard.

According to this method, the sheets according to the invention advantageously have a double-fold endurance of from 30% to 100%, preferably from 50% to 100%, greater than the double-fold endurance of a sheet of the same composition, the polyurethane being replaced by styrene-butadiene as described in the aforementioned document WO 2008/152299.

5. Porosity and Crease Resistance

Crease Test

In order to evaluate the crease resistance of the security sheet, it is possible to carry out measurements of the BENDTSEN porosity before and after creasing.

Specifically, the creasing operation causes, due to the folds formed, a more or less pronounced deterioration of the surface of the paper, leading to an increase in its porosity and therefore in its fragility. By comparing the porosity value of the paper before and after creasing it is therefore possible to evaluate the crease resistance of the latter. The less pronounced the increase in the porosity between the initial sheet and the creased sheet, the less resistant the paper is to creasing. The objective is therefore to obtain porosity values after creasing that are as low as possible.

The crease test therefore makes it possible to determine the crease resistance of papers such as banknote papers and packaging papers.

The apparatus used corresponds to that described by the National Bureau Of Standards (Carson, F. T. Shaw, M. B. *Wearing quality of experimental currency type papers, J. Research NBS* 36, 256-257 (1946) RP 1701).

The apparatus comprises:

a) a device for rolling the paper test specimen into a cylinder. This device consists of a split sheath, within which a movable two-tined fork is placed, b) a tube, one of the ends of which is provided with a movable cover, c) a cylinder guide that slides inside the tube, d) a cylindrical guide that makes it possible to keep the piston on the inside and in a vertical position, the lower base of which piston rests on the end of a lever. The cylindrical guide is designed so that the tube may slide between this guide and the piston, e) a lever mounted on a pivot, f) a weight at the end of the long arm of the lever, opposite the end of the short arm which supports the piston.

The creasing force is adjusted by the position of the weight on the arm of the lever, so that the pressure on the piston is 10 kg/cm$^2$±0.1 kg/cm$^2$.

The various cylindrical parts: guide, tube, piston must be able to slide freely and in particular to slide under their weight.

When the tube and piston are in place in the guide, the piston must fall or rise depending on whether the weight at the end of the lever is lifted up or pulled down.

Sampling and Conditioning

The sampling and the conditioning of the test specimens are carried out according to the NFQ 03-009 and NFQ 03-010 standards. For one particular objective, the test specimens may be measured as is. Given that the test specimen is constantly handled, it is necessary, in order to avoid exchanges of moisture with the operator, that the latter wears gloves of a moisture-barrier material during the preparation of the test specimens and the execution of the test.

Preparation of the Test Specimens

Test specimens having a side of 67 mm are cut using a template. The machine direction is marked on each test specimen.

Procedure

When the fork gap and the two slots of the sheath are aligned, introduce the test specimen in the machine direction up to its halfway point, then roll it by rotating the fork.

The tube, with the cover closed, is then slid so as to be continuous with the sheath and the rolled test specimen is transferred thereto by a back and forth movement of the fork.

The tube, held by the cover with one hand, is then placed in a vertical position on the piston. The creasing is carried out by pressing on the cover until the end of the long arm of the lever is lifted above its rest position. It is important that the pressure exerted be sufficient to raise the weight, but neither too strong nor too fast that the lever comes to a stop. One means of controlling the force is to use both hands one on top of the other to push on the cover.

The cover is opened and the test specimen is creased in the form of a small accordion, and removed from the tube. It is flattened back out by careful stretching out by hand: acting too abruptly could produce, on the side, notches that could result in the test specimen tearing.

The straightened-out test specimen is presented again for rolling in front of the slot of the sheath but turned 90° with respect to the first introduction; the complete cycle is repeated.

Eight cycles are carried out in this way, with a rotation of 90° each time, and by turning over the test specimen after the fourth time.

In particular, it is possible to wait for a certain time between each cycle, for example thirty minutes, to allow the self-repairing material to restructure. This makes it possible to come close to the actual circulation conditions that the crease resistance test seeks to reproduce. Indeed, during the circulation of information supports, the stresses are applied repeatedly but occasionally.

Measurement of the Crease Resistance

The air permeability of each test specimen is measured before and after creasing using a BENDTSEN porosity meter according to the ISO 5636-3 standard.

Since the measurement has to be carried out under the same conditions before and after creasing, it is necessary in both cases to remove the stop from the head of the porosity meter if the normal course is insufficient for being able to slide the creased test specimen.

After creasing, the porosity is measured as follows: each test specimen is straightened out until it is reasonably flat. This may be easily carried out by holding the test specimen between the thumb and the index finger on two opposite sides then by stretching it in three or four places. This operation is repeated on the two other sides; carrying out this operation four times in all is generally sufficient to obtain a sufficiently flat test specimen.

In order to form a circular surface on the test specimen, the flatness of which circular surface is such that the surface leaks are negligible with respect to the porosity measurement, each test specimen is introduced between the jaws of the clamping device of a bursting strength tester and a pressure sufficient to mark the paper is applied for two seconds. The porosity is measured while ensuring that the head of the BENDTSEN porosity meter is centered on the surface pressed against the bursting strength tester.

Repeatability

The number of test specimens to be tested depends on the sampling studied. The reproducibility of the test is such that one test specimen per sample sheet is sufficient.

Results

According to this method, the porosity of the sheets according to the invention after creasing may vary from 1 to 20 ml/min, in particular from 1 to 12 ml/min.

6. Internal Bond Strength and Crease Resistance

Crease Test

In order to evaluate the crease resistance of the security sheet, it is possible to carry out internal bond strength measurements before and after creasing.

Specifically, the creasing operation causes, due to the folds formed, a more or less pronounced deterioration of the inter-fiber bond, leading to a reduction in its internal bond strength and therefore to an increase in its fragility. By comparing the internal bond strength value of the paper before and after creasing, it is therefore possible to evaluate a portion of the crease resistance of the latter. The higher the absolute value of the internal bond strength, the more resistant the paper is to creasing. The objective is therefore to obtain internal bond strength values after creasing that are as high as possible.

The crease test therefore makes it possible to determine the crease resistance of papers such as banknote papers and packaging papers.

The apparatus used corresponds to that described by the National Bureau Of Standards (Carson, F. T. Shaw, M. B. *Wearing quality of experimental currency type papers, J. Research NBS* 36, 256-257 (1946) RP 1701).

The apparatus comprises:

a) a device for rolling the paper test specimen into a cylinder. This device consists of a split sheath, within which a movable two-tined fork is placed, b) a tube, one of the ends of which is provided with a movable cover, c) a cylinder guide that slides inside the tube, d) a cylindrical guide that makes it possible to keep the piston on the inside and in a vertical position, the lower base of which piston rests on the end of a lever. The cylindrical guide is designed so that the tube may slide between this guide and the piston, e) a lever mounted on a pivot, and f) a weight at the end of the long arm of the lever, opposite the end of the short arm which supports the piston.

The creasing force is adjusted by the position of the weight on the arm of the lever, so that the pressure on the piston is 10 $kg/cm^2 \pm 0.1$ $kg/cm^2$.

The various cylindrical parts: guide, tube, piston must be able to slide freely and in particular to slide under their weight.

When the tube and piston are in place in the guide, the piston must fall or rise depending on whether the weight at the end of the lever is lifted up or pulled down.

Sampling and Conditioning

The sampling and the conditioning of the test specimens are carried out according to the NFQ 03-009 and NFQ 03-010 standards. For one particular objective, the test specimens may be measured as is. Given that the test specimen is constantly handled, it is necessary, in order to avoid exchanges of moisture with the operator, that the latter wears gloves of a moisture-barrier material during the preparation of the test specimens and the execution of the test.

Preparation of the Test Specimens

Test specimens having a width of 7 cm and a length of 14 cm are cut using a template. The machine direction is marked on each test specimen.

Procedure

When the fork gap and the two slots of the sheath are aligned, introduce the test specimen in the machine direction up to its halfway point, then roll it by rotating the fork.

The tube, with the cover closed, is then slid so as to be continuous with the sheath and the rolled test specimen is transferred thereto by a back and forth movement of the fork.

The tube, held by the cover with one hand, is then placed in a vertical position on the piston. The creasing is carried out by pressing on the cover until the end of the long arm of the lever is lifted above its rest position. It is important that the pressure exerted be sufficient to raise the weight, but neither too strong nor too fast that the lever comes to a stop. One means of controlling the force is to use both hands one on top of the other to push on the cover.

The cover is opened and the test specimen is creased in the form of a small accordion, and removed from the tube. It is flattened back out by careful stretching out by hand: acting too abruptly could produce, on the side, notches that could result in the test specimen tearing.

The straightened-out test specimen is presented again for rolling in front of the slot of the sheath but turned 180° with respect to the first introduction; the complete cycle is repeated.

Eight cycles are carried out in this way, with a rotation of 180° each time, and by turning over the test specimen after the fourth time.

In particular, it is possible to wait for a certain time between each cycle, for example thirty minutes. This makes it possible to come close to the actual circulation conditions that the crease resistance test seeks to reproduce. Indeed, during the circulation of information supports, the stresses are applied repeatedly but occasionally.

Measurement of the Internal Bond Strength

The internal bond strength of each test specimen is measured before and after creasing using a SCOTT apparatus (model B, No. ES033) according to the TAPPI UM403 standard.

Repeatability

The number of test specimens to be tested depends on the sampling studied. The reproducibility of the test is such that one test specimen per sample sheet is sufficient.

Results

According to this method, the sheets according to the invention advantageously have an internal bond strength of from 10% to 100%, preferably from 30% to 70%, greater than the internal cohesion strength of a sheet of the same composition, the polyurethane being replaced by styrene-butadiene as described in the aforementioned document WO 2008/152299.

In the text, the expressions "greater than . . . " and "less than . . . " are understood to mean that the limits are included, unless otherwise mentioned.

The invention is illustrated in greater detail by the examples described below, given by way of illustration and with no limiting nature.

EXAMPLES

The sheets A, B, C, D, E and F and 1 to 9 tested below are prepared according to the common papermaking process, that is to say in particular by drainage, pressing and then drying of aqueous suspensions, the compositions of which by dry weight are given in tables 1 and 2 below.

The amount of polyamide-amine-epichlorohydrin resin (PAAE resin) is set at 2.5% by dry weight relative to the total dry weight of the fibers and of the polyurethane.

The PAAE resin acts as a wet strength agent in comparative examples A, C and E.

In examples B, D, F and 1 to 9, the PAAE resin acts as a cationic flocculating agent and also a wet strength agent.

Two types of cellulosic fibers were used.

Said sheets then undergo, according to common practice in the papermaking field, an external surfacing, as described previously, deposited in a proportion of 5 $g/m^2$/face. Said surfacing is carried out by a size press.

The sheets A, B, C, D, E and F and 1 to 9 thus obtained, corresponding respectively to comparative examples A, B, C, D, E and F and to examples 1 to 9 according to the invention, were subjected to the tests described above.

Results:

TABLE 1

1st series

| Examples | Grammage (g/m²) | Thickness (μm) | Dry breaking length (m) | Wet breaking length (m) | Tear index (mN · m²/g) | Schopper folding (Double folds) | Porosity (Crease resistance) (ml/min) Before creasing | Porosity (Crease resistance) (ml/min) After creasing |
|---|---|---|---|---|---|---|---|---|
| Comparative example A: 100% Cellulosic fibers 1 | 102.1 | 124 | 4513 | 2213 | 6.6 | 900 | 1 | 62 |
| Comparative example B: 10% Dispersion of carboxylated styrene-butadiene copolymer + 90% Cellulosic fibers 1 | 99.8 | 120 | 4237 | 2469 | 6.2 | 1109 | 0 | 15 |
| Example 1 according to the invention: 10% Dispersion of polyurethane-polyester (Elongation at break = 600%) + 90% Cellulosic fibers 1 | 101 | 120 | 5100 | 2729 | 5.6 | 1900 | 0 | 7 |
| Example 2 according to the invention: 10% Dispersion of polyurethane-polyester (Elongation at break = 700%) + 90% Cellulosic fibers 1 | 98.8 | 119 | 4869 | 2605 | 6.1 | 1528 | 0 | 15 |
| Example 3 according to the invention: 10% Dispersion of polyurethane-polyester (Witcobond 435-82 ® from Baxenden-Kemira, Elongation at break = 1500%) + 90% Cellulosic fibers 1 | 96.1 | 116 | 4715 | 2548 | 5.4 | 1891 | 0 | 12 |
| Example 4 according to the invention: 10% Dispersion of polyurethane-polyester (Elongation at break = 1600%) + 90% Cellulosic fibers 1 | 99.1 | 117 | 4831 | 2693 | 6.0 | 2102 | 0 | 11 |
| Example 5 according to the invention: 10% Dispersion of polyurethane-polycarbonate (Impranil DLC ® from Bayer, Elongation at break = 600%) + 90% Cellulosic fibers 1 | 102.8 | 120 | 4813 | 2774 | 5.9 | 1705 | 0 | 15 |
| Comparative example C: 100% Cellulosic fibers 2 | 95.5 | 120 | 5587 | 2765 | 7.4 | 2091 | 0 | 43 |
| Comparative example D: 10% Dispersion of carboxylated styrene-butadiene copolymer + 90% Cellulosic fibers 2 | 94.5 | 123 | 4825 | 2320 | 7.4 | 2218 | 0 | 10 |
| Example 6 according to the invention: 10% Dispersion of polyurethane-polyester (Edolan SN ® from Tanatex Chemicals, Elongation at break = 1100%) + 90% Cellulosic fibers 2 | 98.2 | 110 | 5556 | 3181 | 7.9 | 3305 | 0 | 9 |
| Example 7 according to the invention: 10% Dispersion of polyurethane-polyester (Elongation at break = 1300%) + 90% Cellulosic fibers 2 | 92.8 | 118 | 6127 | 3432 | 7.6 | 3480 | 0 | 12 |

Interpretation of the Results:

As table 1 of the results shows, the sheets of examples 1 to 7 according to the invention have tensile strength values, in particular dry and wet breaking lengths, much greater than those of comparative examples B and D.

Moreover, the sheets of examples 1 to 7 have tearing strength values comparable to those of comparative examples A, B, C and D, which shows that the use of polyurethanes does not degrade the tearing strength properties.

Furthermore, for the sheets according to the invention, the double-fold endurance is greatly increased with respect to the sheets of comparative examples A, B, C and D.

Similarly, the sheets of examples 1 to 7 have crease resistances that are unchanged with respect to comparative examples B and D taken as reference.

Thus, with respect to a given fibrous composition, the tests have made it possible to demonstrate the improvement in the mechanical performances by the use of polyurethane in accordance with the invention.

TABLE 2

2nd series

| Examples | Grammage (g/m²) | Thickness (μm) | Dry breaking length (m) | Wet breaking length (m) | Tear index (mN · m²/g) | Schopper folding (Double folds) | Porosity (Crease resistance) (ml/min) Before creasing | Porosity (Crease resistance) (ml/min) After creasing | Internal bond strength (Crease resistance) (Scott units) Before creasing | Internal bond strength (Crease resistance) (Scott units) After creasing |
|---|---|---|---|---|---|---|---|---|---|---|
| Comparative example E: 100% Cellulosic fibers 3 | 91.0 | 107 | 6849 | 3272 | 8.78 | 1471 | 20 | 295 | 354 | 76 |
| Comparative example F: 10% Dispersion of carboxylated styrene-butadiene copolymer + 90% Cellulosic fibers 3 | 95.9 | 107 | 5869 | 3376 | 8.09 | 1772 | 10 | 74 | 539 | 245 |
| Example 8 according to the invention: 10% Dispersion of polyurethane-polyester (Elongation at break = 600%) + 90% Cellulosic fibers 3 | 97.5 | 113 | 7273 | 3782 | 7.68 | 2345 | 9 | 72 | 669 | 376 |
| Example 9 according to the invention: 10% Dispersion of polyurethane-polyester (Elongation at break = 1300%) + 90% Cellulosic fibers 3 | 102 | 116 | 6963 | 3575 | 7.64 | 2482 | 16 | 77 | 666 | 387 |

Interpretation of the Results:

As table 2 of the results shows, the sheets of examples 8 and 9 according to the invention have tensile strength values, in particular dry and wet breaking lengths, much greater than those of comparative examples E and F.

Moreover, for the sheets of examples 8 and 9 according to the invention, the double-fold endurance is greatly increased with respect to the sheets of comparative examples E and F.

Furthermore, the sheets of examples 8 and 9 have crease resistances, based on the porosity, that are unchanged with respect to comparative example F taken as reference.

Similarly, the sheets of examples 8 and 9 have crease resistances, based on the internal bond strength, that are improved with respect to the sheets of comparative examples E and F.

Thus, with respect to a given fibrous composition, the tests have made it possible to demonstrate the improvement in the mechanical performances by the use of polyurethane in accordance with the invention.

The invention claimed is:

1. A crease-resistant security sheet comprising:
   fibers,
   polyurethane aggregates, the polyurethane being in a proportion of between 5% and 45% by dry weight relative to the total dry weight of the fibers and of the polyurethane and having an elongation at break of greater than 600%, and
   a main cationic flocculating agent in an amount of between 1% and 5% by dry weight relative to the total dry weight of the fibers and of the polyurethane.

2. The security sheet as claimed in claim 1, wherein the proportion of said polyurethane is between 10% and 30% by dry weight relative to the total dry weight of the fibers and of the polyurethane.

3. The security sheet as claimed in claim 1, wherein said polyurethane has an elongation at break of greater than 1000%.

4. The security sheet as claimed in claim 1, wherein said polyurethane has a glass transition temperature below 0° C.

5. The security sheet as claimed in claim 1, wherein said polyurethane has a glass transition temperature below −25° C.

6. The security sheet as claimed in claim 1, wherein said polyurethane has a glass transition temperature below −40° C.

7. The security sheet as claimed in claim 1, wherein said polyurethane is selected from the group consisting of a polyurethane-polyester, a polyurethane-polyether, and a polyurethane-polycarbonate.

8. The security sheet as claimed in claim 1, wherein said polyurethane is a polyurethane-polyester.

9. The security sheet as claimed in claim 1, wherein said main cationic flocculating agent is selected from the group consisting of a cationic resin, polyacrylamides, polyethyleneimines, polyvinylamines, and mixtures thereof.

10. The security sheet as claimed in claim 1, wherein said main cationic flocculating agent is a polyamide-amine-epichlorohydrin resin.

11. The security sheet as claimed in claim 1, wherein said fibers comprise cellulosic fibers.

12. The security sheet as claimed in claim 11, wherein said cellulosic fibers is present in a proportion of greater than 60% by dry weight relative to the total dry weight of the fibers and of the polyurethane.

13. The security sheet as claimed in claim 1, wherein said fibers comprise synthetic fibers.

14. The security sheet as claimed in claim 13, wherein said synthetic fibers is present in an amount of between 5% and 30% relative to the total dry weight of the fibers and of the polyurethane.

15. The security sheet as claimed in claim 1, wherein said sheet comprises a secondary cationic flocculating agent selected from the group consisting of polyacrylamides, polyethyleneimine, polyvinylamines, and mixtures thereof, in an amount which may be between 0.1% and 0.5% by dry weight relative to the total dry weight of the fibers and of the polyurethane.

16. The security sheet as claimed in claim 1, wherein said sheet comprises at least one security element.

17. The security sheet as claimed in claim 1, wherein said sheet comprises an RFID device.

18. The security sheet as claimed in claim 1, wherein said sheet comprises an external surfacing layer.

19. A process for manufacturing a security sheet as described in claim 1, consisting in forming said sheet via a wet route from an aqueous suspension comprising:
   fibers,
   an anionic dispersion of a polyurethane, and
   a main cationic flocculating agent,
   then draining and drying said sheet.

20. A process according to claim 19, wherein said polyurethane is in a proportion of between 5% and 45% by dry weight relative to the total dry weight of the fibers and of the polyurethane and has an elongation at break of greater than 600.

21. A process according to claim 19, wherein said main cationic flocculating agent is in an amount of between 1% and 5% by dry weight relative to the total dry weight of the fibers and of the polyurethane.

22. The process as claimed in claim 19, wherein said fibers, said anionic dispersion of polyurethane, and said main cationic flocculating agent are mixed in bulk.

23. A security document, comprising a security sheet as described in claim 1.

24. The security document as claimed in claim 23, wherein said document is a means of payment, an identity document, or a card.

25. The security document as claimed in claim 24, wherein said document is a banknote, a driving license, or a card.

\* \* \* \* \*